Sept. 19, 1933.  E. G. K. ANDERSON  1,927,780
MEANS TO PREVENT LOSS OF SCREWS
Filed Jan. 9, 1932
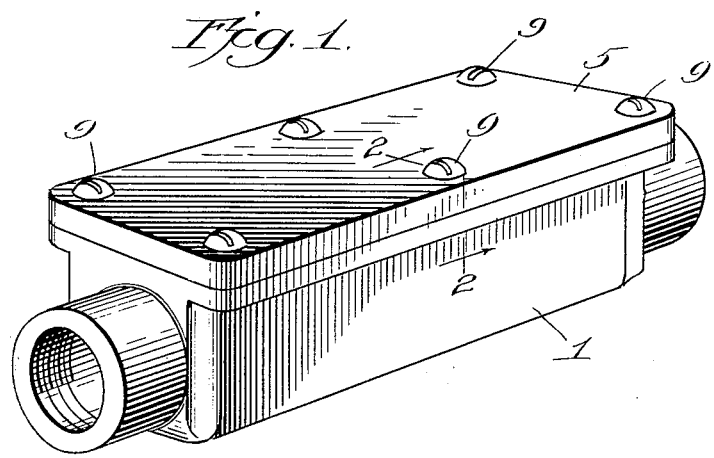
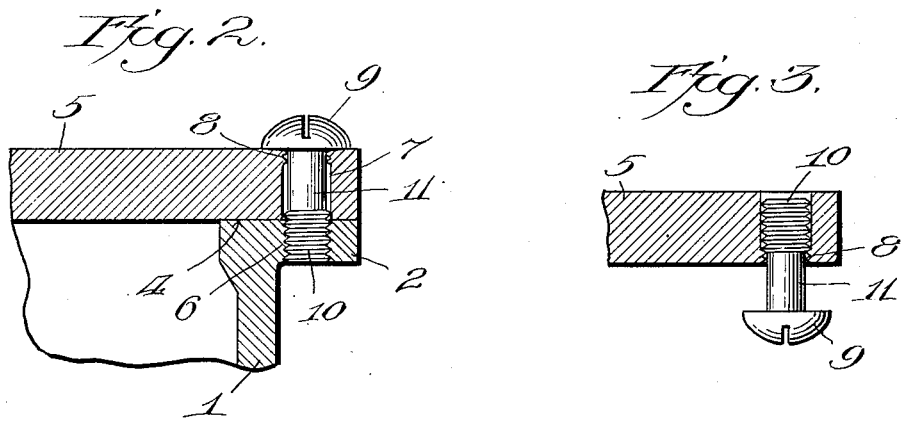
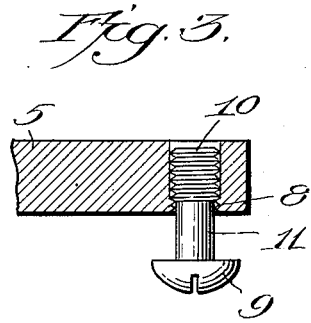
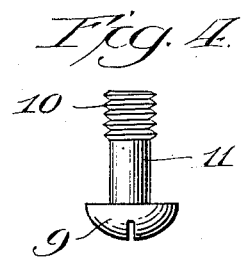
Inventor:
E. G. K. Anderson,
by Wm. F. Freudenreich,
Atty Patented Sept. 19, 1933

1,927,780

UNITED STATES PATENT OFFICE 1,927,780

MEANS TO PREVENT LOSS OF SCREWS

Ernst G. K. Anderson, Evanston, Ill., assignor to Appleton Electric Company, a corporation of Illinois Application January 9, 1932. Serial No. 585,651

6 Claims. (Cl. 220—24)

In many places, where two members are fastened together with screws, as, for example, in the case of an outlet or connection box having a cover held to the box by a plurality of screws, inconvenience and loss of time often result from the loss of a screw or screws or from the dropping of the same so that it must be recovered. The object of the present invention is to make it possible, in a simple manner and at substantially no cost, to interlock the screws with one of the members to be connected together thereby, so that, in the ordinary use of such members, there will be no danger of loss or misplacement of the screws.

Ordinarily, in fastening a metal cover to a metal box, for example, screws pass loosely through holes in the cover and enter screw-threaded holes in the box. Whenever a screw is turned back far enough to free it from the box, there is nothing to hold it in place, and it may, and usually does, drop out of the cover. If there are, say, half a dozen screws for fastening a cover to a connection box, the workman must insert one screw at a time through the cover and into the box, at the time of making an installation. When, at any time, the cover is to be taken off, all of the screws must be removed and be laid aside until the cover is again to be applied. In accordance with my invention, I provide each of the screw holes in the cover with a short threaded section at the outer end; the inner end of each hole being left large enough to permit the screws to move freely through the same. Then, instead of having the entire stem portion of each screw threaded, I screw thread only a short section of the stem at the free end of the latter, fashioning the remainder of each stem, between the screw-threaded section and the head, into a neck sufficiently small in diameter to pass freely through the screw-threaded portion of a hole in the cover. The neck part of each screw is made longer than the screw-threaded section in the hole in the cover through which the screw passes. The screws are applied to the cover by screwing them into place; the screw-threaded ends passing entirely through the screw-threaded sections of the holes and entering the portions of the holes that are of large diameter. The screw-threaded part of each hole then serves as a flange or internal collar that acts as a stop to engage the head at one end of the screw and prevent the screw from dropping through the hole in one direction, and also to engage the enlarged screw-threaded part at the inner end of the screw and prevent the screw from dropping out in the other direction. By making the neck of each screw long and the screw-threaded part of each screw shorter than the distance between screw threads in the box and the screw threads in the corresponding hole in the cover, the threads on the screw will never engage the threads on the cover and on the box at the same time. As the screws can be applied to the cover in the factory, they will already be in the cover when the installation is to be made in a building or elsewhere. When a cover is to be removed from a box, the screws are simply turned until they are freed from the box. Further turning of the screws in a direction to unscrew them will have no effect, because the threads on the screw cannot catch the threads on the cover unless the screws are deliberately drawn out by hand. In other words, the screws cannot become accidentally disconnected from the cover by the act of removing the cover from the box.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a connection box embodying the present invention; Fig. 2 is a section, on a somewhat larger scale, on line 2—2 of Fig. 1; Fig. 3 is a view showing that part of the cover appearing in Fig. 2 separated from the box and turned upside-down; and Fig. 4 is an elevation of one of the screws.

In the drawing I have illustrated my invention as applied to a connection box and, for the sake of brevity, shall confine the detailed description to this embodiment. It will, of course, be understood that my invention is applicable to any member which is to be fastened to another member by a screw or screws.

Referring to the drawing, 1 represents a box having at the top an outwardly-directed flange 2 provided with a plane upper face 4. Resting on the face 4 is a cover 5. In the flange are the usual screw holes 6 registering with holes 7 extending entirely through the cover. The holes 7 may be the ordinary small holes ordinarily employed, slightly modified. In accordance with my invention, instead of making the holes 7 smooth throughout their lengths, I place in the upper end of each of these holes one or two screw threads 8 similar to the threads in the holes in the box. Therefore, screws adapted to fit the holes in the box cannot be moved freely through the holes in the cover, but must be screwed through the cover. My purpose would not be served by a construction that would permit the screws to be engaged at one and the same time with threads in the box and in the cover, and, therefore, I employ special screws, each consisting of a head 9, a screw-threaded section 10, and a neck 11 of reduced diameter connecting the parts 9 and 10 together. The neck portion of the screw may slide freely through the screw-threaded part of the corresponding hole in the cover, and, by making the neck much longer than the screw-threaded section in the hole in the cover, the tightening and the unscrewing of the screw is performed in precisely the same manner as though there were no threads in the cover. Furthermore, the length of the threaded section of the screw must be no greater, but preferably be shorter, than the distance between the screw threads and those in the cover. In other words, after the screw has been unscrewed far enough to release it from the box, its upper thread should stand clear of the lower thread in the cover so that further turning of the screw will not cause the threads on the screw to enter the threads in the cover. In the arrangement shown, since the threads in the box stop at the plane top face 4 of the box, that portion of the hole in the cover that has no threads should be at least as long as, and preferably somewhat longer than, the threaded section 10 of the screw.

It will be seen that, as long as the cover is detached from the box, the screws are interlocked therewith so that the cover may be turned upside-down, as shown in Fig. 3, without permitting the screws to drop out. Consequently, the screws are always in position in the cover and cannot become lost or mislaid unless they are willfully unscrewed from the cover.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a box, a cover resting on the box, the box having screw-threaded openings, the cover having openings therethrough registering with the openings in the box, the outer ends of the openings in the cover having screw threads similar to those in the box and the inner portions of the openings in the cover being of a diameter at least as great as the greatest diameter of the aforesaid screw threads, screws extending through the openings in the cover and into the openings in the box; each screw having a head at its outer end, a screw-threaded part at its inner end, and a neck of reduced diameter connecting the head and the screw-threaded part; the neck of each screw being longer than the screw-threaded part of the corresponding opening in the cover, and the length of the screw-threaded part of each screw being less than the distance between the screw threads in the corresponding openings in the box and cover.

2. In combination, a box, a cover, the box having screw-threaded openings, the cover having openings therethrough registering with the openings in the box, there being in the outer ends of the openings in the cover screw threads similar to those in the box, and the inner portions of the openings in the cover being large enough to permit the free passage of screws adapted to fit the openings in the box and the threaded portions of the openings in the cover, and headed screws extending through the openings in the box, each screw having a screw-threaded end shorter than the distance between the inner screw thread in the cover and the outer screw thread in the box, and each screw having a reduced neck connecting the head and the screw-threaded end, the neck being smaller in diameter than the smallest internal diameter of the screw-threaded portion of the openings in the cover and box.

3. In combination, a box, a cover resting on the box, the box having screw-threaded openings, the cover having openings therethrough registering with the openings in the box, the outer ends of the openings in the cover having screw threads similar to those in the box and the inner portions of the openings in the cover being of a diameter at least as great as the greatest diameter of the aforesaid screw threads, screws extending through the openings in the cover and into the openings in the box; each screw having a head at its outer end, a screw-threaded part at its inner end, and a neck of reduced diameter connecting the head and the screw-threaded part; the neck of each screw being at least as long as the screw-threaded part of the corresponding opening in the cover, and the length of the screw-threaded part of each screw being such that the screws may be unscrewed from the box while the cover is engaged with the latter without engaging the threads on the screw with the threads in the corresponding opening in the cover.

4. In combination, a box, a cover, the box having screw-threaded openings, the cover having openings therethrough registering with the openings in the box, there being in the outer ends of the openings in the cover screw threads similar to those in the box, and the inner portions of the openings in the cover being large enough to permit the free passage of screws adapted to fit the openings in the box and the threaded portions of the openings in the cover, and headed screws extending through the openings in the box, each screw having a screw-threaded end shorter than the distance between the inner screw thread in the cover and the outer screw thread in the box, and each screw having a reduced neck connecting the head and the screw-threaded end.

5. In combination, two members adapted to be secured together, one member having an opening therethrough, the outer end of said opening being screw-threaded and the remaining or inner portion of the opening being of a diameter at least as great as the largest diameter of the screw threads, a screw in said opening, said screw having a head lying outwardly from the screw-threaded end of said opening and a neck of reduced diameter longer than the screw-threaded portion of the opening, said screw having at the inner end a screw-threaded part whose screw threads are complementary to those in the opening, said second member having a screw-threaded opening adapted to receive the threaded end of the screw; the relative lengths of the neck and the threaded part of the screw and of the unthreaded part of said opening being such that the screw may be freed from said second member before the threaded end enters the threads in said opening.

6. In combination, two members adapted to be secured together, one member having an opening therethrough, the outer end of said opening being screw-threaded and the remaining or inner portion of the opening being of a diameter at least as great as the largest diameter of the screw threads, a screw in said opening, said screw having a head lying outwardly from the screw-threaded end of said opening and a neck of reduced diameter longer than the screw-threaded portion of the opening, said screw having at the inner end a screw-threaded part whose screw-threads are complementary to those in the opening, said second member having a screw-threaded opening adapted to receive the threaded end of the screw; the relative lengths of the neck and the threaded part of the screw and of the unthreaded part of said opening being such that the screw may be completely unscrewed from said second member and its threaded end housed in the unthreaded part of said opening before the screw rises far enough to cause its threads to mesh with those in the opening.

ERNST G. K. ANDERSON.